United States Patent
Taneja et al.

(10) Patent No.: US 9,217,417 B2
(45) Date of Patent: Dec. 22, 2015

(54) RAM AIR TURBINE GENERATOR WITH EXTERNAL ROTOR HAVING PERMANENT MAGNETS

(71) Applicant: GE Aviation Systems LLC, Grand Rapids, MI (US)

(72) Inventors: Dinesh Nath Taneja, Vandalia, OH (US); Paul James Wirsch, Jr., Springboro, OH (US)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 259 days.

(21) Appl. No.: 13/664,625

(22) Filed: Oct. 31, 2012

(65) Prior Publication Data
US 2014/0246858 A1    Sep. 4, 2014

(51) Int. Cl.
 *F03D 9/00* (2006.01)
 *F03D 1/06* (2006.01)
 *B64D 41/00* (2006.01)

(52) U.S. Cl.
 CPC .............. *F03D 9/002* (2013.01); *B64D 41/007* (2013.01); *F03D 1/065* (2013.01); *Y02E 10/721* (2013.01); *Y02T 50/44* (2013.01)

(58) Field of Classification Search
 CPC ....... F03D 9/002; F03D 1/065; B64D 41/007; B64D 41/00; B64D 2041/002; B64D 2221/00; F05D 2220/34; F01D 25/28
 USPC .................................... 290/43, 44, 52, 54, 55
 See application file for complete search history.

(56) References Cited

U.S. PATENT DOCUMENTS

| | | | | |
|---|---|---|---|---|
| 4,477,040 A | * | 10/1984 | Karanik | 244/58 |
| 5,484,120 A | * | 1/1996 | Blakeley et al. | 244/54 |
| 2005/0129517 A1 | * | 6/2005 | Eccles et al. | 416/170 R |
| 2008/0224475 A1 | * | 9/2008 | Mellor et al. | 290/55 |
| 2011/0133485 A1 | * | 6/2011 | Gieras et al. | 290/1 R |
| 2011/0236218 A1 | * | 9/2011 | Russ et al. | 416/246 |
| 2013/0071232 A1 | * | 3/2013 | Taneja et al. | 415/122.1 |

* cited by examiner

*Primary Examiner* — Tulsidas C Patel
*Assistant Examiner* — Viet Nguyen
(74) *Attorney, Agent, or Firm* — General Electric Company; William S. Munnerlyn

(57) ABSTRACT

A ram air turbine generator, for generating electrical power when the system is exposed to an airstream, includes a turbine having multiple blades and a rotor operably coupled to the blades and rotating about a shaft and stator mounted, such that rotation of the blades rotates the rotor, and the rotation of the rotor about the stator produces electrical power.

15 Claims, 3 Drawing Sheets

RAM AIR TURBINE GENERATOR WITH EXTERNAL ROTOR HAVING PERMANENT MAGNETS

BACKGROUND OF THE INVENTION

Ram Air Turbine (RAT) systems are used in contemporary aircraft as emergency or supplemental power systems. They typically have a turbine, with a rotating hub and a plurality of blades, operably coupled to an electric generator to provide the driving source for the generator. Initially in flight they are stowed in a compartment of the aircraft fuselage, covered by a compartment door. When needed as a source of emergency or supplemental power, the RAT system is deployed from the fuselage into the surrounding airstream, which drives the blades to rotate the generator to extract energy from the airstream. As power requirements for aircraft systems increase, the power generation capabilities of RAT systems continue to increase.

BRIEF DESCRIPTION OF THE INVENTION

In one aspect, a ram air turbine generator for an aircraft includes a stator having multiple windings, a rotor at least partially encasing the stator and having multiple permanent magnets, and a propeller coupled to the rotor for co-rotation with the rotor and having multiple blades, wherein air flowing over the blades rotates the propeller to rotate the rotor, which rotates the permanent magnets about the multiple windings to generate an electric current, such as by inducing an electric voltage, in the windings.

DESCRIPTION OF EMBODIMENTS OF THE INVENTION

Figure 1:
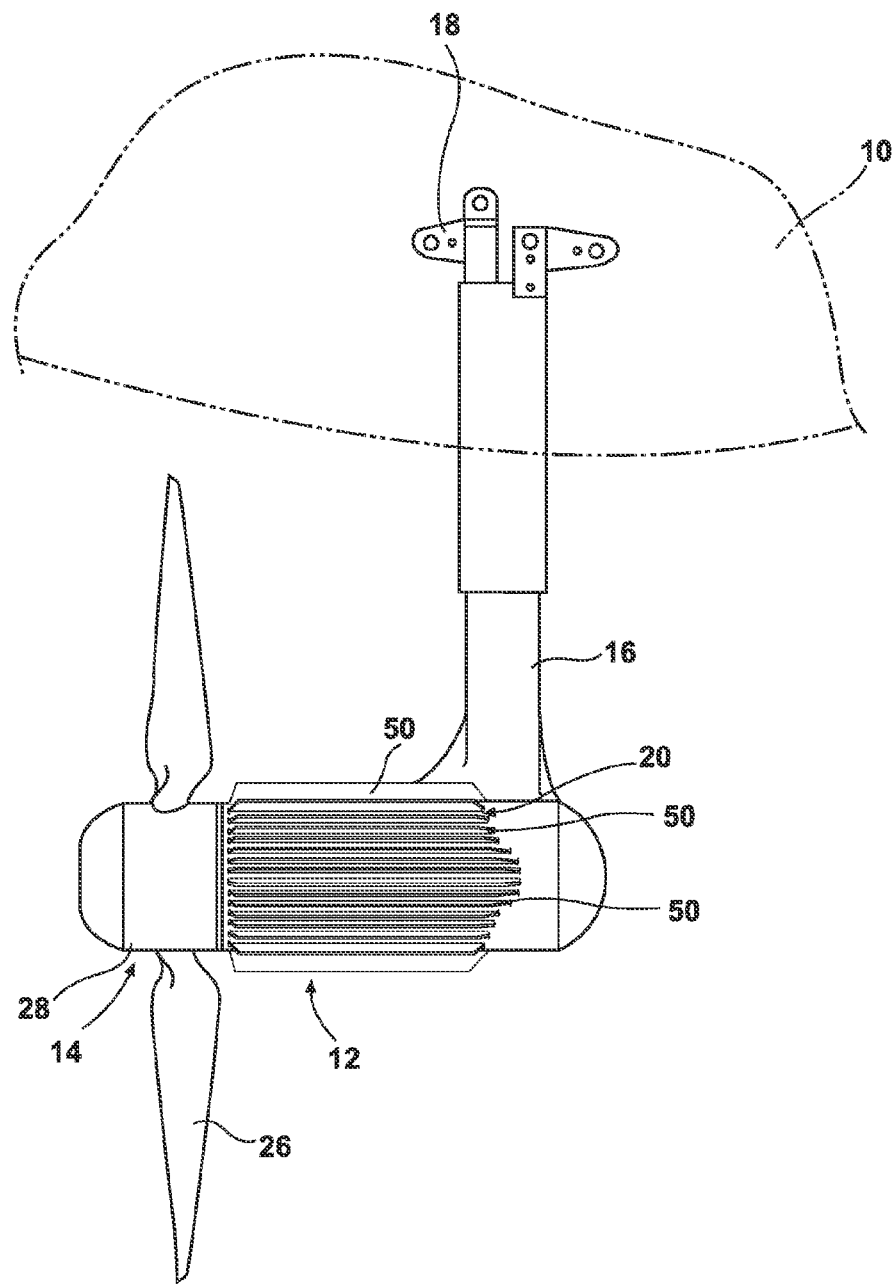
FIG. 1 is a side view illustrating a portion of an aircraft having a ram air turbine in accordance with one embodiment of the invention.

As illustrated in FIG. 1, an aircraft 10 may include a RAT system 12 for generating electrical power for the aircraft 10 when the RAT system 12 is exposed to the airstream exterior of the aircraft 10. The RAT system 12 may include a RAT 14, which may be suspended from the aircraft 10 by a pylon 16 and mounting assembly 18. The RAT 14 may be stored within a suitable compartment in the fuselage or wing of the aircraft 10 and may be deployed quickly and easily by moving the pylon 16 relative to the mounting assembly 18, thereby moving the RAT system 12 to an exposed position within the air stream flowing past the aircraft 10.

Figure 2:
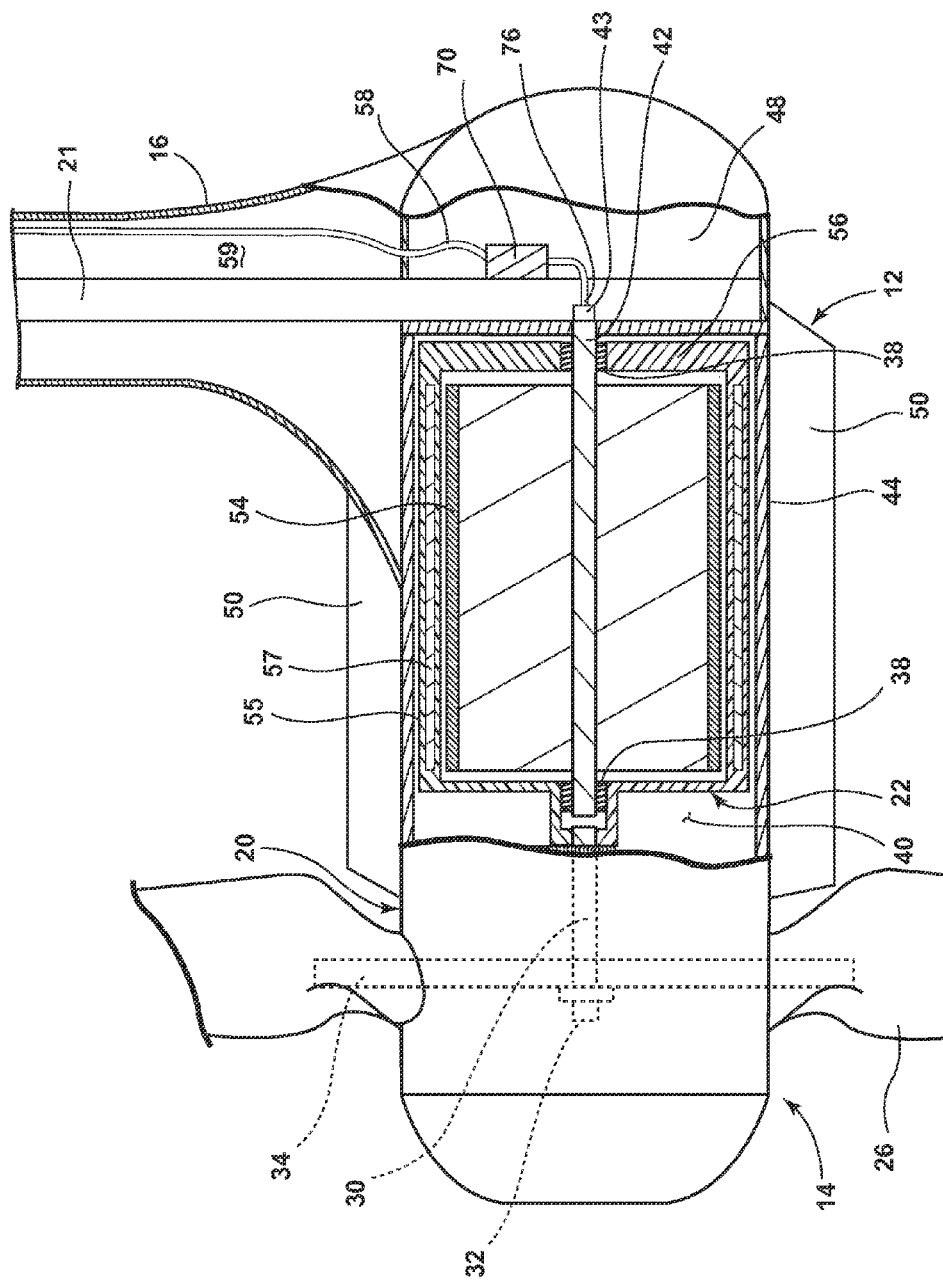
FIG. 2 is a schematic cross sectional view of the ram air turbine of FIG. 1.

As illustrated in FIG. 2, the RAT 14 includes a housing 20 in which is located an electrical generator 22. The housing 20 includes a mounting plate 21 closing an end of the housing 20 and configured to mount to a portion of the aircraft 10. A turbine in the form of multiple blades 26 projecting from a propeller 28 is provided on another end of the housing 20, opposite the mounting plate 21. Although only two blades 26 have been shown in the illustrated embodiment it is contemplated that any number of blades 26 may be used.

The turbine further includes a turbine output shaft 30, which may be operably coupled at a first end 32 to the blades 26 such that rotation of the blades 26 rotates the turbine output shaft 30. The turbine output shaft 30 may be operably coupled to the blades 26 in any suitable manner and may project rearwardly from the blades 26 to provide a rotary output for driving an auxiliary power unit, such as the electrical generator 22. By way of non-limiting example, a rotor shaft 34 may extend from the blades 26 and may be splined, or otherwise suitably mechanically coupled, with the turbine output shaft 30 such that rotation of the blades 26 is transferred through the rotor shaft 34 to the turbine output shaft 30. Alternatively, the blades 26 or a portion of the propeller 28 may be coupled directly to the turbine output shaft 30. A second end 36 of the turbine output shaft 30 may be operably coupled to a portion of the generator 22.

The housing 20, as illustrated, comprises a body 44, which is closed by opposing first and second end caps 46, 48, to provide a common housing defining an interior 40 for receiving the generator 22. As illustrated, the housing 20 may also include a plurality of heat-dissipating fins or cooling fins 50. The cooling fins 50 may be formed in any suitable manner such that they project outwardly from a periphery of the housing 20. The cooling fins 50 may be spaced about the periphery of the body 44. The size and number of the cooling fins 50 may be a function of the specific heat dissipation requirements of the RAT system 12.

The mounting plate 21 is configured for carrying the RAT system 12 in such a way that the mounting plate 21 mounts to the pylon 16. The generator 22 may be electrically coupled via conductor cables 58 to the aircraft 10. The pylon 16 may also define a passage 59 through which the conductor cables 58 from the generator 22 may pass to the aircraft 10. In this manner, the conductor cables 58, and any other linkages between the RAT system 12 and the aircraft 10, may be protectively concealed within the pylon 16 to lessen damage.

The generator 22 is located within the housing interior 40 and further comprises a stator 54 surrounded by a rotor housing 55, illustrated as formed from magnetic soft steel, which defines a rotor 56. In this sense, the generator 22 is of an external rotor configuration. The stator 54 may have any suitable structure, such as a core comprising a wound lamination forming a slotted structure in which are received multiple electrical windings that are radially evenly spaced about the core. The rotor 56 may also be of any suitable structure and is illustrated as a rotor with multiple permanent magnets 57 defining the poles of the rotor. The permanent magnets 57 may be affixed to the rotor housing 55, which may have slots in which the magnets 57 are received.

The generator 22 further comprises a stator support in the form of a non-rotating mounting shaft 42 having at least a first end 43 mounted to the mounting plate 21 in a cantilevered arrangement. While a cantilevered arrangement is illustrated, other mounting arrangements are possible. The stator 54 is fixedly mounted to the mounting shaft 42, such as by sliding the stator core onto the mounting shaft 42. A key/keyway configuration may be formed in the stator core and the mounting shaft 42 to prevent rotation of the stator 54 relative to the mounting shaft 42.

When assembled, the rotor 56 is spaced apart from the stator 54, the housing body 44, and the mounting plate 21 to provide for mechanical clearance during rotation. The rotor housing 55 is rotationally supported on spaced bearings 38 mounted to the mounting shaft 42, which provides for the rotation of the rotor housing 55 about the mounting shaft 42. The RAT 14 is operably coupled to the rotor housing 55 by the turbine output shaft 30 such that the rotation of the propeller 28 associated with air flowing through the blades 26 rotates the rotor housing 55.

The generator 22 further comprises a generator control unit (GCU) 70, having a controller 72, and a full wave rectifier 74, such as a full wave silicon controlled rectifier, wherein the GCU 70 is physically positioned within the second housing end cap 48 and electrically positioned between the voltage output 76 of the stator windings and the conductor cables 58. The GCU 70 operates to rectify and regulate the generated electricity for transmission to the aircraft 10 electrical systems. Typical aircraft voltages are exemplified as 28VDC and 270VDC, but may vary as electrical systems require. Although the GCU 70 is illustrated in the rear of the generator 22, alternate positioning, such as within the aircraft 10, is contemplated. The controller 72 may contain one or more insulated-gate bipolar transistors (IGBT) organized in a typical buck/boost converter configuration.

During operation of the RAT system 12, the RAT 14 is extended into the airstream surrounding the aircraft, the airstream flowing over the blades 26 causes the blades 26 to rotate, which in turn causes the turbine output shaft 30 to rotate at the same rotations per minutes as the blades 26. The turbine output shaft 30 drives the rotor housing 55 about the mounting shaft 42 and stator 54 to produce GCU-regulated electricity that may be transferred to the aircraft 10 through the conductor cables 58.

Figure 3:
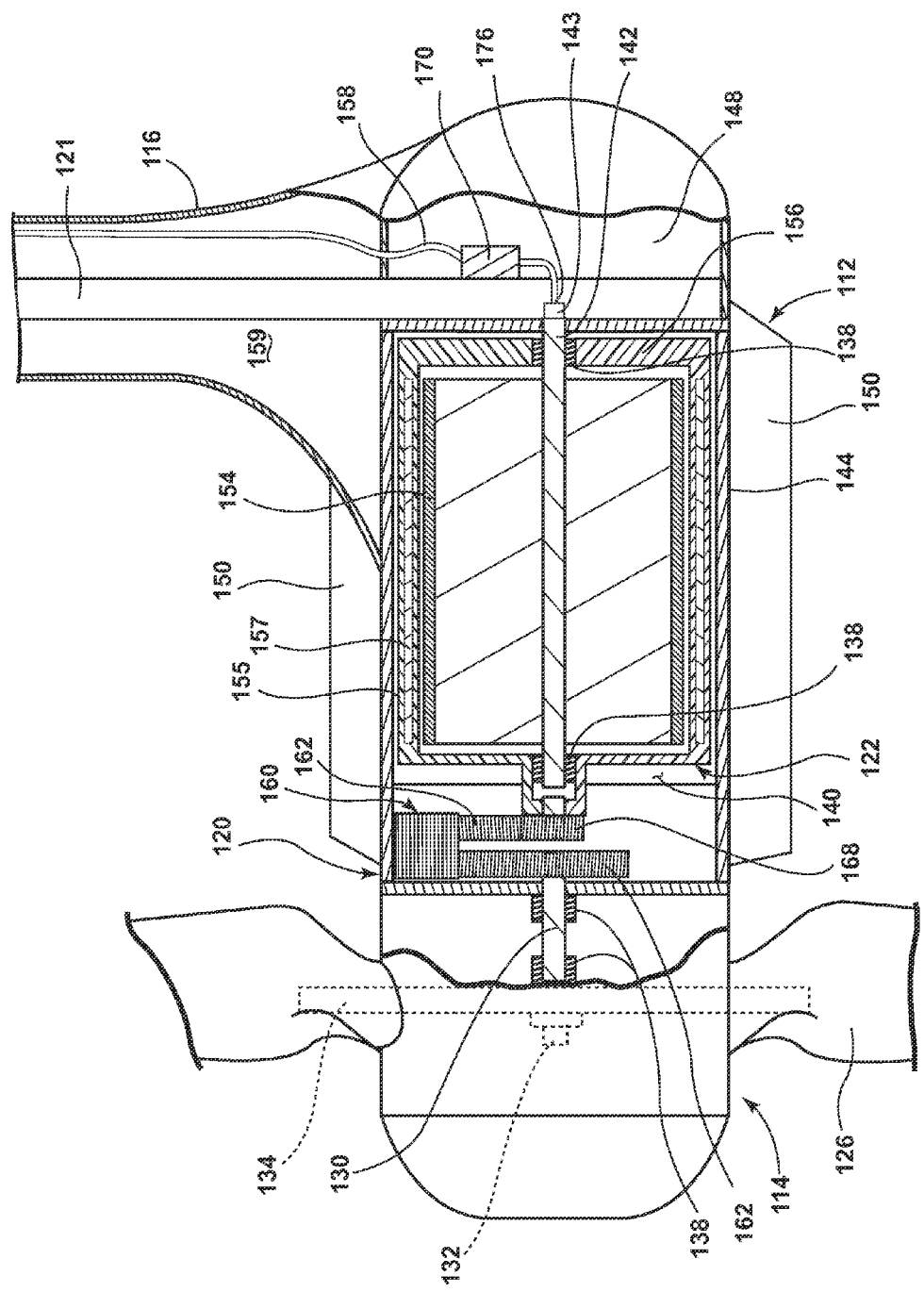
FIG. 3 is a schematic cross sectional view of the ram air turbine with integrated gearbox assembly according to a second embodiment of the invention.

Furthermore, FIG. 3 illustrates an alternative RAT system 112 according to a second embodiment of the invention. The second embodiment is similar to the first embodiment; therefore, like parts will be identified with like numerals increased by 100, with it being understood that the description of the like parts of the first embodiment applies to the second embodiment, unless otherwise noted. A difference between the first embodiment and the second embodiment is that the RAT housing 120 includes a gearbox 123 having a gearbox output element 124 coupling the RAT 14 to the generator 122, instead of the direct connection of the first embodiment.

As illustrated, the second end 136 of the turbine output shaft 130 may be operably coupled to a portion of the gearbox 123. The rotor housing 155 may then be operably coupled to the gearbox output element 124 such that the gearbox output element 124 may provide driving force for the rotor housing 155 such that electrical power may be generated.

The gearbox 123 may include a speed-increasing gear train 160. More specifically, an input gear 162, a first idler gear 164, a second idler gear 166, and an output drive gear 168 may be included in the speed-increasing gear train 160. The input gear 162 may be referred to by other names but has been referenced here as an input gear because power is input to the speed-increasing gear train 160 of the gearbox 123 at the input gear end of the speed-increasing gear train 160. The input gear 162 may be splined or otherwise suitably mechanically coupled to the turbine output shaft 130, generally near its second end 136. Input gear 162 meshes with the first idler gear 164, which has a height spanning across both the input gear 162 and the second idler gear 166. In this manner, the first idler gear 164 may mesh with the second idler gear 166. The second idler gear 166 may in turn mesh with the output drive gear 168, which may be splined, or otherwise suitably mechanically coupled, to the gearbox output element 124, which is illustrated as a shaft that may be rotatably supported by bearings 138. The bearings 138 may be provided in an arrangement to rotatably support the gearbox output element 124 coaxially with the turbine output shaft 130.

Other configurations for the gearbox 123, including the gear train 160 are possible. For example, although the gearbox 123 is illustrated as being located within the RAT housing 120 with the generator 122 it may be in a separate housing coupled to the generator 122.

During operation of the RAT system 112, the RAT 114 is extended into the airstream surrounding the aircraft, the airstream flowing over the blades 126 causes the blades 26 to rotate, which in turn causes the turbine output shaft 130 to rotate at the same rotations per minutes as the blades 126. The turbine output shaft 130 drives the input gear 162 of the speed-increasing gear train 160, which in turn drives the first and second idler gears 164, 166, which in turn drives the output drive gear 168 and the gearbox output element 124. The speed-increasing gear train 160 causes the gearbox output element 124 to rotate at a faster speed than the blades 126 and acts to convert the low speed incoming rotation to high speed rotation suitable for generating electricity.

By way of non-limiting example the generator 22 may be configured to generate at least 30 kW at 20,000 rpm. More specifically, the ratio of the input gear 162 to the output drive gear 168 may be selected such that the output drive gear 168 rotates at a substantially greater speed than the input gear 162. The gear configuration and gear ratios in the speed-increasing gear train 160 may be selected such that the gearbox output element 124 rotates at 20,000 rpm in response to a predetermined rotational speed of the turbine output shaft of 6,000 rpm. The rotor housing 155 is driven by the gearbox output element 124 and causes the generator 122 to produce GCU-regulated electricity that may be transferred to the aircraft 110 through the conductor cables 158.

The generator 22 may further be of pancake type construction, wherein both the stator 54 and rotor 56 are larger in diameter and smaller in axial length compared to a typical RAT system. The pancake type construction is known to generate equal amounts of power as a typical RAT system at slower propeller 28 and rotor 56 rotational speeds without the need for a speed-increasing gearbox 123. By way of non-limiting example, a pancake type generator 22 may be configured to generate at least 30 kW at 6,000 rpm. Thus, application of a pancake type construction generator may be preferable for inherently increased reliability due to fewer components, slow rotation operating conditions, or in aircraft that require less axial room for RAT system incorporation.

Many other possible embodiments and configurations in addition to that shown in the above figures are contemplated by the present disclosure. For example, one embodiment of the invention contemplates a mounting shaft 42 that is attached to the mounting plate 21 such that both the stator 54 is rotatable about a common axis with the rotor housing 55, wherein the rotation of the stator 54 may be in the same or opposite direction as the rotor housing 55. Furthermore, in such an embodiment, the rotational speed of the stator 54 may differ with the speed of the rotor housing 55. Another example of the invention contemplates using a self-contained oil system for cooling, or air for cooling. A further example of the invention contemplates having either an open or volcanic ask proof construction. Additionally, the design and placement of the various components may be rearranged such that a number of different in-line configurations could be realized.

The embodiments disclosed herein provide a PMG RAT system with inside out construction. One advantage that may be realized in the above embodiments is that the above described embodiments have superior weight and size advantages over the conventional type RAT systems. With the proposed pancake type arrangement, a high peripheral speed PMG can be achieved without gears since the reliable containment of the permanent magnet is inherent with the cylinder ring, providing containment and a flux return path. More-over, higher peripheral speed can be achieved because the electromagnetic gap is minimal since it is the same as the mechanical radial clearance. The higher peripheral speed results in a lower generator electromagnetic weight.

When designing aircraft components, important factors to address are size, weight, and reliability. The above described RAT systems have a decreased number of parts as the system will be able to provide regulated DC outputs with minimal power conversion equipment, making the complete system inherently more reliable. This results in a lower weight, smaller sized, increased performance, and increased reliability system. The lower number of parts and reduced maintenance will lead to a lower product costs and lower operating costs. Reduced weight and size correlate to competitive advantages during flight.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A ram air turbine generator for an aircraft comprising:
   a mounting plate configured to close a first end of a generator housing and mount to a pylon extendable from an aircraft;
   a first shaft fixedly mounted to the mounting plate;
   a stator fixedly mounted to the first shaft and having multiple windings;
   a rotor housing rotatably mounted to the first shaft and at least partially encasing the stator;
   multiple axially-oriented, permanent magnets, each defining a pole of the rotor and mounted to an inner surface of the rotor housing in an orientation substantially parallel to the first shaft; and
   a propeller operably coupled to the rotor housing via a second shaft and having multiple blades;
   wherein air flowing over the blades rotates the propeller to rotate the second shaft, which rotates the rotor housing and permanent magnets about the multiple windings to generate an electric current in the windings.

2. The ram air turbine of claim 1 wherein an end of the first shaft is fixed to the mounting plate.

3. The ram air turbine of claim 1 wherein the multiple windings are radially evenly spaced about the stator.

4. The ram air turbine of claim 3 wherein the multiple permanent magnets comprise at least two diametrically opposed permanent magnets.

5. The ram air turbine of claim 1 wherein the rotor housing comprises a cylinder rotatably mounted to the first shaft.

6. The ram air turbine of claim 5 further comprising a pair of bearings, each bearing provided on the first shaft on an opposite side of the stator, and the cylinder mounts to the bearings.

7. The ram air turbine of claim 1 wherein the rotor housing forms a magnetic flux return path.

8. The ram air turbine of claim 1 wherein the propeller is operably coupled to the rotor housing via the second shaft and a gearbox.

9. The ram air turbine of claim 8 wherein the gearbox is supported at least in part by the first shaft.

10. The ram air turbine of claim 8 wherein the gearbox provides a speed-increasing gear train such that a gearbox output element rotates at a faster speed than the propeller.

11. A ram air turbine generator for an aircraft comprising:
    a mounting plate that closes an end of a generator housing, and mounts the generator to a pylon extendable from an aircraft;
    a mounting shaft mounted to the mounting plate;
    a stator having multiple windings mounted to the mounting shaft;
    a rotatable rotor at least partially encasing the stator and having multiple axially-oriented, permanent magnets, each defining a pole of the rotor and mounted to the rotor in an orientation substantially parallel to the axis of rotation; and
    a propeller coupled, via a turbine output shaft, to the rotor for co-rotation with the rotor and having multiple blades;
    wherein air flowing over the blades rotates the propeller to rotate the turbine output shaft, which rotates the rotor and permanent magnets about the multiple windings to generate an electric current in the windings.

12. The ram air turbine of claim 11 wherein the multiple windings are radially evenly spaced about the stator.

13. The ram air turbine of claim 12 wherein the multiple permanent magnets comprise at least two diametrically opposed permanent magnets.

14. The ram air turbine of claim 11 wherein the generator further comprises a gearbox coupled to the turbine output shaft, having a gearbox output element operably coupled to the rotor.

15. The ram air turbine of claim 14 wherein the gearbox provides a speed-increasing gear train such that the gearbox output element rotates at a faster speed than the propeller.

* * * * *